United States Patent [19]
Honda et al.

[11] Patent Number: 5,626,426
[45] Date of Patent: May 6, 1997

[54] SELF-ALIGNING ROLLER BEARING WITH RETAINER

[75] Inventors: Akiyoshi Honda; Masahide Matsubara; Eiichi Kawamura; Fukuji Kikkawa; Kunio Fukuda, all of Fujisawa; Teruo Nagao, Osaka, all of Japan

[73] Assignees: NSK Ltd., Tokyo; Nakanishi Metal Works Co., Ltd., Osaka, both of Japan

[21] Appl. No.: 636,544

[22] Filed: Apr. 25, 1996

[30] Foreign Application Priority Data

Apr. 26, 1995 [JP] Japan .................................. 7-101962

[51] Int. Cl.$^6$ ............................................ F16C 33/46
[52] U.S. Cl. ........................ 384/568; 384/571; 384/572
[58] Field of Search ............................ 384/571, 580, 384/568, 572, 575, 576

[56] References Cited

U.S. PATENT DOCUMENTS

| | | | |
|---|---|---|---|
| 3,915,522 | 10/1975 | Halbig | 384/571 |
| 5,007,747 | 4/1991 | Takeuchi et al. | 384/571 |

*Primary Examiner*—Lenard A. Footland
*Attorney, Agent, or Firm*—Helfgott & Karas, P.C.

[57] ABSTRACT

A self aligning roller bearing with retainer comprises an outer ring having an outer ring raceway in a shape of a spherical concave surface with a single center, an inner ring having a pair of inner ring raceways opposite to the outer ring raceway, a plurality of convex rollers provided rotatable between the outer ring raceway and the inner ring raceway, and a pair of retainers comprising a main portion formed in a hollow cylindrical frustum shape and having a plurality of crossbars, an outwardly flanged portion extending radially outward from the larger diameter end of the main portion and an inwardly flanged portion extending radially inward from the smaller diameter end of the main portion, and connected to the outwardly flanges portion by the crossbars so as to form a plurality of pockets each defined by two of the crossbars and outwardly and inwardly flanged portions to receive one of the convex rollers, the outwardly flanged portion having protrusions each protruding towards the pocket so as to rub against or be in close proximity to the first end face of the convex rollers, and the protrusions having an end face for guiding each of the convex rollers retained inside the respective pockets.

3 Claims, 9 Drawing Sheets

1

SELF-ALIGNING ROLLER BEARING WITH RETAINER

BACKGROUND OF THE INVENTION

1. Field of the Invention

This invention relates to a self-aligning roller bearing with retainer which can be installed in various kinds of mechanical devices, for example, to support a rotating shaft inside a housing.

2. Description of the Related Art

Conventionally, in order to freely rotatably support a heavy shaft inside a housing, a self-aligning roller bearing with retainer as shown in JP Patent First Publication KOKAI No. H5-157116 was used. As in FIG. 1, this kind of self-aligning roller bearing with retainer comprises an outer ring 1, an inner ring 2 arranged concentric with the outer ring 1, a plurality of convex rollers 3 located in two rows between the outer ring 1 and the inner ring 2 and arranged so that they turn freely, and a pair of retainers or cages 4 used for preventing the convex rollers 3 from becoming separated. The retainers or cages 4 are made by press-forming a metal plate and referred to as press retainers or cages.

An outer raceway 5 having a spherical concave surface with a single center is formed on the inner peripheral surface of the outer ring 1. Also, a pair of inner raceways 6 are formed on the outer peripheral surface of the inner ring 2 and juxtaposed in the axial direction of the roller bearing (left and right direction of FIG. 1) to face the outer raceway 5. The convex rollers 3 are respectively formed generally symmetrically in the direction of roller axis with the section having the largest diameter located in the axial center of the roller length in the direction of roller axis, and arranged in two rows between the outer raceway 5 and the pair of inner raceways 6 so that they turn freely. It will be noted that the roller axis is tilted by a predetermined amount with reference to the axial direction of the roller bearing.

The retainers or cages 4 as shown in FIGS. 1 and 2 has a main part 7 having larger and smaller diameter sections in a frustum shape, an outward flange 8 extending outward in the radial direction from the peripheral edge of the larger diameter section of the main part 7, and an inward flange 9 extending inward in the radial direction from the peripheral edge of the smaller diameter section of the main part 7.

There are a plurality of pockets 10 formed in the main part 7, wherein each of the pockets 10 supports one of the convex rollers 3 so that it turns freely.

In addition, the roller bearing has a guide ring 11 which is freely rotatably located between the two rows of convex rollers 3.

The outward flanges 8 of the pair of retainers 4 are guided by the guide ring 11 with the outer peripheral edge of the outward flanges 8 fitted into the inner peripheral surface of the guide ring 11.

The guide ring 11 has the either axial side thereof positioned closer to the axially inside end face of the convex rollers 3 to guide the convex rollers 3 so that the rotational axis or roller axis of the convex rollers 3 is prevented from being inclined or "skewed" from its normal condition.

The term "axially inside" in the present specification means the central portion side of the roller bearing while the term "axially outside" means the open end side of the roller bearing.

In the self-aligning roller bearing with retainer described above, in order that a rotating shaft (not shown) is supported inside the housing (not shown), the outer ring 1 is inserted into and fixed to the housing with the inner ring 2 fixed from outside to the rotating shaft. When the inner ring 2 rotates together with the rotating shaft, the convex rollers 3 turn allowing the rotating shaft to rotate. If the axis of the housing does not coincide with the axis of the rotating shaft, the inner ring 2 is aligned inside the outer ring 1 to compensate for the non-coincidence. Specifically the central axis of the inner ring 2 is inclined with respect to the central axis of the outer ring 1. Because the outer race 5 is formed with a single spherical surface, rotation of the convex rollers 3 is smooth even after compensation of the non-coincidence.

Used in the self-aligning roller bearing with retainer in FIG. 3 are the retainers 4 which do not have the outwardly extending flanges 8 of FIGS. 1 and 2, and instead are formed such that the inner peripheral face of the axially inside end portion of the retainers 4 is positioned close to the outer peripheral edge of the guide ring 11.

In the case of FIG. 3, the guide ring 11 has its either side face positioned closer to the axially inside end face of the convex rollers 3 for guide so as to prevent the convex rollers 3 from skewing.

There are problems in the prior art self-aligning roller bearings with retainer as follows.

Specifically, when a larger load is applied in an axial direction (left-right direction in FIGS. 1 and 3) in the self-aligning roller bearing with retainer, one row of the convex rollers 3 has its rolling surface strongly abutted to the outer raceway 5 and the inner raceway 6 to support the load while the other row of the rollers 3 does not.

There is substantially no contact pressure between the rolling face of the convex rollers 3 in the other row and the outer and inner ring raceways 5 and 6, so that the other row of the convex rollers 3 can be moved in the axial direction of the roller bearing. Accordingly, the guide rings 11 can be displaced toward the other row of the convex rollers 3, increasing the distance between the axially inside end face of the convex rollers 3 in the one row and the corresponding side face of the guide ring 11. In this case, the rollers 3 in the one row is readily skewed.

When the self-aligning roller bearing with retainer as shown in FIGS. 1 and 3 is subjected to an axial load, e.g. a leftward load on the outer ring 1, or a rightward load on the inner ring 2, the guide rings 11 may be displaced leftward in FIGS. 1 and 3, so that the convex rollers 3 in the right row supporting the axial load tend to be skewed.

When the convex rollers 3 supporting the load are skewed, frictional forces between the rolling face of the convex rollers 3 and the outer ring raceway 5, and between the rolling face of the convex rollers 3 and the inner ring raceway 6 become excessive, the rotation torque of the bearing becomes large. And, in the worst case, seizure etc. is undesirably caused.

Incidentally, no special problem will occur in the case when the convex rollers 3 exposed to substantially no axial load (e.g. the convex rollers 3 in the left row in FIGS. 1 and 3 in the care mentioned above) are skewed.

In the construction where the guide ring 11 is guided by the inner ring 2 as shown in FIG. 3, the inner peripheral face of the guide ring 11 comes slidably into contact with the outer peripheral face of the inner ring 2 in the direction of revolution. This is referred to as "revolution slide".

In addition, the revolution slide occurs between the guide ring 11 and the convex rollers 3.

Such revolution slide will produce frictional heat, so that the temperature within the self-aligning roller bearing is increased, which may reduce the performance of the self-aligning roller bearing.

The copending JP Patent Application No. H6-202264 laid open under No. KOKAI 8-28576 discloses a self-aligning roller bearing, which is prevented from being skewed as shown in FIGS. 4 to 6.

The self-aligning roller bearing with retainer in the copending JP patent application has retainers 4 therein which are, like the retainers 4 of the prior art construction as shown in FIGS. 1 and 2, made from a metal plate through press-forming, and comprised of a frustum shaped main portion 7 having a larger diameter end edge portion and a smaller diameter end edge portion, an outward flange portion 8 extending radially outwards from the larger diameter end edge portion, and an inward flange portion 9 extending radially inwards from the smaller end edge portion.

There are a plurality of pockets 10 formed in the main portions 7, so that the respective pockets receive rotatably a convex roller 3, respectively. Specifically, the respective pockets 10 are defined by a pair of crossbars 7a and the outward and inward flange portions 8, 9.

The main portions 7 are located radially outward of the pitch circle of the convex rollers 3, so that the convex rollers 3 are prevented from moving radially outwards out of the main portion 7 through the pockets 10.

In addition, in the case of FIGS. 4 to 6, a projection 13 is formed on either side of each of the crossbars 7a in the main portion 7, and located at the central portion of the circumferential opposite ends of the respective pockets 10.

The projections 13 protrude circumferentially and have a tip end which is tapered such that the amount of projecting from the edge of the crossbars 7a is increased as it extends radially outwards.

Since the projections 13 are engaged with the rolling faces of the convex rollers 3, respectively, the convex rollers 3 are prevented from slipping out of the pockets 10 radially outward of the retainers 4 (upward on FIG. 4).

The inward flanges 9 have a radially outer half, the axially outside face of which is formed with a flat face 14 to prevent the radially outer half of the inward flanges 9 from being projected from the end faces 1a of the outer ring 1 and from the end faces 2a of the inner ring 2. The flat face 14 extends substantially parallel to the end face 1a of the outer ring 1 and to the end face 2a of the inner ring 2 when the retainers 4 are installed in the self-aligning roller bearing.

The outward flanges 8 have an axially outside face which is faced to the pockets 10 and formed with a plurality of flat guide faces 15.

The guide faces 15 circumferentially adjacent to each other are connected to each other through a connecting face 16. In other words, the guide faces 15 and connecting faces 16 are circumferentially alternately positioned.

The guide faces 15 are closer and parallel to the axially inside end faces 17 of the convex rollers 3 held within the pockets 10 when installed in the self-aligning roller bearing. In this state, the convex rollers 3 are guided by the guide faces 15, so that the rotation axis of the convex rollers 3 is prevented from being tilted or skewed from the normal condition.

In addition, when a pair of retainers 4 are installed in the self-aligning roller bearing so as to support the convex rollers 3 in rows, the axially inside end faces 18 of the outward flange portion 8 of the retainers 4 are circumferentially engaged with each other.

Accordingly, the retainers 4 are rotated in the same direction guided by each other.

The operation of the self-aligning roller bearing with retainer of the copending JP patent application for supporting the rotating shaft inside the housing is substantially the same as that of the prior art self-aligning roller bearing with retainer previously explained.

Specifically, since the axially inside end faces 17 of the convex rollers 3 are guided by the guide faces 15 on the axially outside face of the outward flanges 8, the relationship between the end faces 17 and the guide faces 15 does not change regardless of the operation of the self-aligning roller bearing.

In other words, even when the outer ring 1 or inner ring 2 experiences the axial load so that the axial position relationship between the outer ring raceway 5 and inner ring raceway 6 is displaced, there is no change in the clearance between the end faces 17 of the convex rollers 3 and the guide faces 15. Consequently, even when the convex rollers 3 in one row can be axially displaced due to the axial load, the convex rollers 3 in the other row (also in the one row) are hardly skewed.

In the construction as shown in FIGS. 4 to 6, the outward flange portions 8 in the pair of retainers 4 are abutted to each other, and the guide rings 11 as in the prior art construction in FIGS. 1 to 3 are omitted. Consequently, not only the revolution slide is reduced and the frictional heat produced in the bearing is made small, but also the self-aligning roller bearing is lubricated efficiently.

When the interior of the self-aligning roller bearing is lubricated with the inner ring 2 rotated in operation, lubricant oil is supplied generally through e.g. an the inlet port 24 (see FIG. 9) in the axially central portion of the outer ring 1 to the portion where the convex rollers 3 are provided.

In the prior art constructions in FIGS. 1 to 3, the guide ring 11 are reluctant to the flow of lubricant oil. On the other hand, in the roller bearing of the copending JP patent application as in FIGS. 4 to 6 the flow of lubricant oil is smooth and the production cost is lower because the guide ring 11 of the prior art constructions does not exist and the number of parts is reduced.

Although the skew prevention of the convex rollers 3 is improved in the self-aligning roller bearing of the copending JP patent application in FIGS. 4 to 6 comparing with the prior art constructions as shown in FIGS. 1 to 3, the improvement in the following points are still desired.

Specifically, in order to more securely prevent the convex rollers 3 from being skewed, the end faces 17 of the convex rollers 3 must be guided by the guide faces 15 of the outward flange portions 8 while the displacement of the convex rollers 3 must be prevented in the pockets 10.

Specifically, the length of the pockets 10, that is the axial inner dimension of the retainers 4 is made closer to the axial size of the convex rollers 3, so that the convex rollers 3 are hardly displaced or inclined with reference to the pockets 10.

Since the center of the retainer 4 having a larger diameter is not inclined with reference to the center of the self-aligning roller bearing, or even inclined, its inclination angle is very small.

Accordingly, if the convex rollers 3 are prevented from being displaced with reference to the pockets 10, the convex rollers 3 are effectively prevented from being skewed.

However, it is generally difficult to precisely specify, with reference to the dimensions of the convex roller 3, the dimensions of the pocket 10 formed by punching the metal plate, and those of the outwardly flanged portion 8 formed by bending the metal plate. More specifically, since it is necessary to adequately maintain the accuracy of the flatness and evenness of the guide faces 15 faced to the respective pockets 10, over the whole surface, the die required is complicated and difficult to manufacture. Therefore even though possible, the manufacturing costs of the retainer 4 are increased. Moreover, since the length of rubbing engagement between the axially inside end face 17 of the convex roller 3 and the axially outside side face of the outwardly flanged portion 8 is long, the frictional force acting at the rubbing portion is increased. Hence the torque required to rotate the convex roller 3, and the rotation torque for the self aligning roller bearing with retainer is increased. Furthermore, since the width of the gap formed between the guide face 15 of the outwardly flanged portion 8 and the end face 17 of the convex roller 3 is very small, the flow of lubricating oil through the gap is limited. Hence it is difficult to maintain adequate lubrication of the self aligning roller bearing with retain.

SUMMARY OF THE INVENTION

It is an object of the present invention to provide a self aligning roller bearing with retainer which solves the above problems with the conventional self aligning roller bearing with retainer.

It is another object of the present invention to provide a self aligning roller bearing with retainer having convex rollers which are prevented from skewing irrespective of the conditions of use.

DETAILED DESCRIPTION OF THE PREFERRED EMBODIMENT

The self aligning roller bearing with retainer according to the present invention, as with the beforementioned conventional self aligning roller bearing with retainer comprises an outer ring having an inner peripheral face formed with an outer ring raceway being a spherical concave surface with a single center, an inner ring having an outer peripheral face formed with a pair of inner ring raceways opposite to the outer ring raceway, a plurality of convex rollers having first and opposite end faces and provided in two rows so as to be freely rotatable between the outer ring raceway and the inner ring raceways, and a pair of retainers formed with a plurality of pockets for rotatably retaining the convex rollers respectively, and having a main portion of a hollow cylindrical frustum shape. Furthermore, the retainers are each formed with an outwardly flanged portion extending radially outward from a rim of the larger diameter end of the main portion, and an inwardly flanged portion extending radially inward from a rim of the smaller diameter end of the main portion.

In particular, with the self aligning roller bearing with retainer according to the present invention, at least one protrusion is formed on the axially outside face of the outwardly flanged portion of the retainer so as to be opposed to the first end face or axially inside end face of the convex rollers, and protruded in the respective pockets so as to rub against or be in close proximity to the first end face or axially inside end face of the respective convex rollers. The respective protrusions have an end face to serve as guide faces for guiding the convex rollers retained inside the respective pockets.

The bearing operation itself for the self aligning roller bearing with retainer according to the present invention constructed as described above, is substantially the same as for the beforementioned conventional self aligning roller bearing with retainer.

However, with the self aligning roller bearing with retainer of the present invention, since the end faces of the protrusions which protrude towards the inside of the pockets from the axially outside face of the outwardly flanged portion, rub against or are in close proximity to the surfaces of the convex rollers, then displacement of the convex rollers relative to their respective pockets is effectively prevented, so that skewing of the convex rollers can be reliably prevented.

Since the protrusions are axially aligned on the retainer, then the operation of forming the protrusions to a predetermined dimension can be carried out during the final stage of press forming the outwardly flanged portion, using the normal vertical movement of the press machine as is.

Consequently, a number of protrusions can be formed simultaneously with a simple metal die, thus facilitating maintenance of dimensional accuracy.

Figure 5:
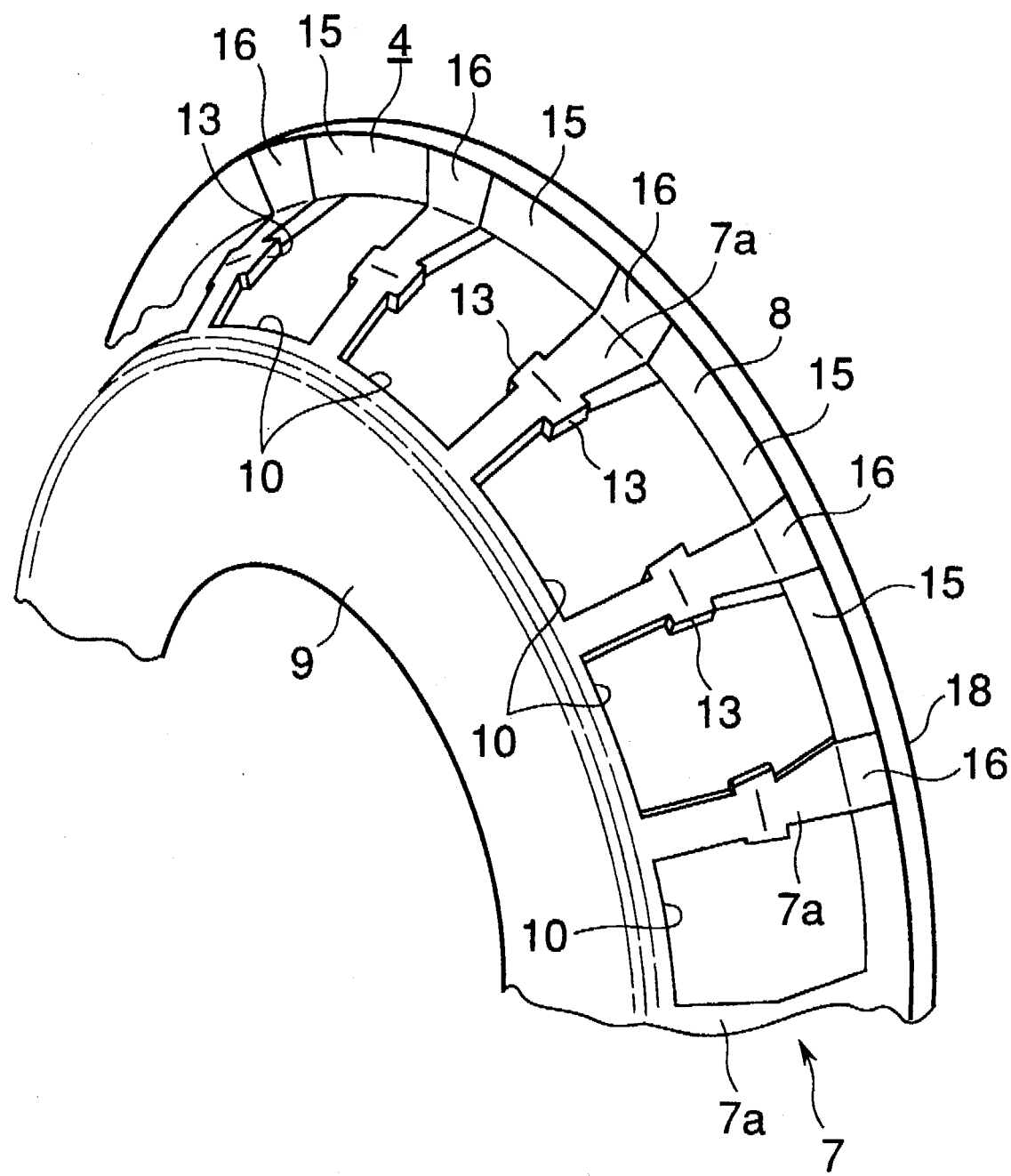
FIG. 5 is a partial perspective view of the retainer to be installed in the roller bearing of FIG. 4.
Figure 6:
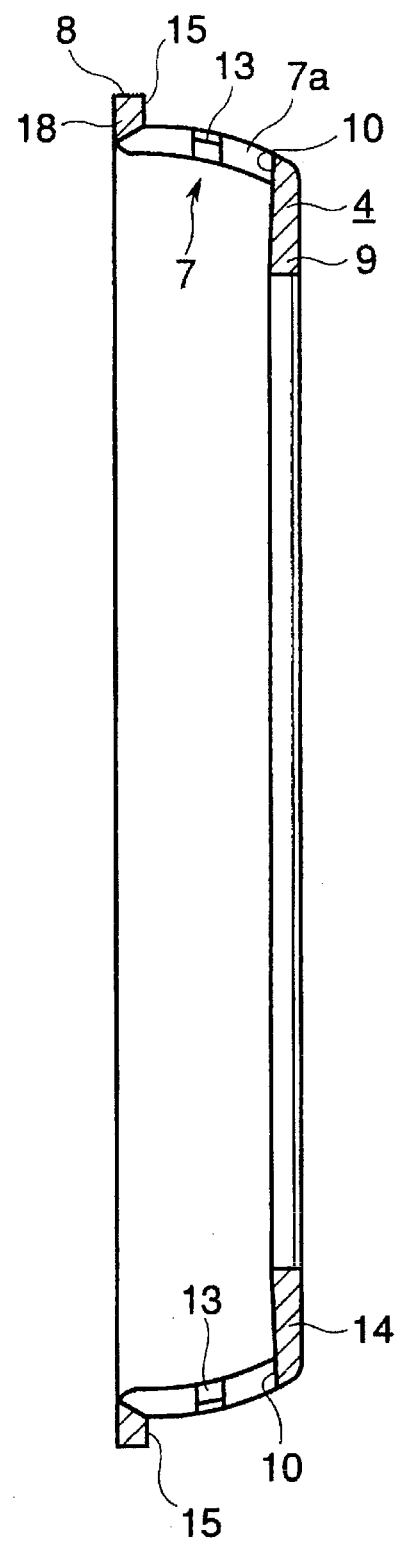
FIG. 6 is a cross-sectional view of the retainer of FIG. 5 with only the pocket appearing in the cross section depicted and with the other pockets omitted.

Furthermore, since the protrusions on the axially outside face of the outwardly flanged portion of the retainer in the present invention are small compared to the flat guide face 15 (refer to FIG. 5) on the axially outside face of the outwardly flanged portion as disclosed in JP Copending Patent Application No. H6-202264, then only a small capacity press machine is required for the process, and dimensional adjustment is simplified. Consequently, manufacturing costs for the retainer are minimized.

Furthermore, since the length of the rubbing engagement between the end face of the protrusion and the axially inside end face of the convex roller is reduced, then the torque required to rotate the convex roller, and the rotation torque for the self aligning roller bearing with retainer is minimized.

Furthermore, since there is a sufficiently large gap between the axially outside face of the outwardly flanged portion and the axially inside end face of the convex roller, at a location away from the protrusion, such that the gap has a sufficient width equal to or greater than the height of the protrusion, then lubrication of the self aligning roller bearing with retainer can be adequately maintained.

Figure 1:
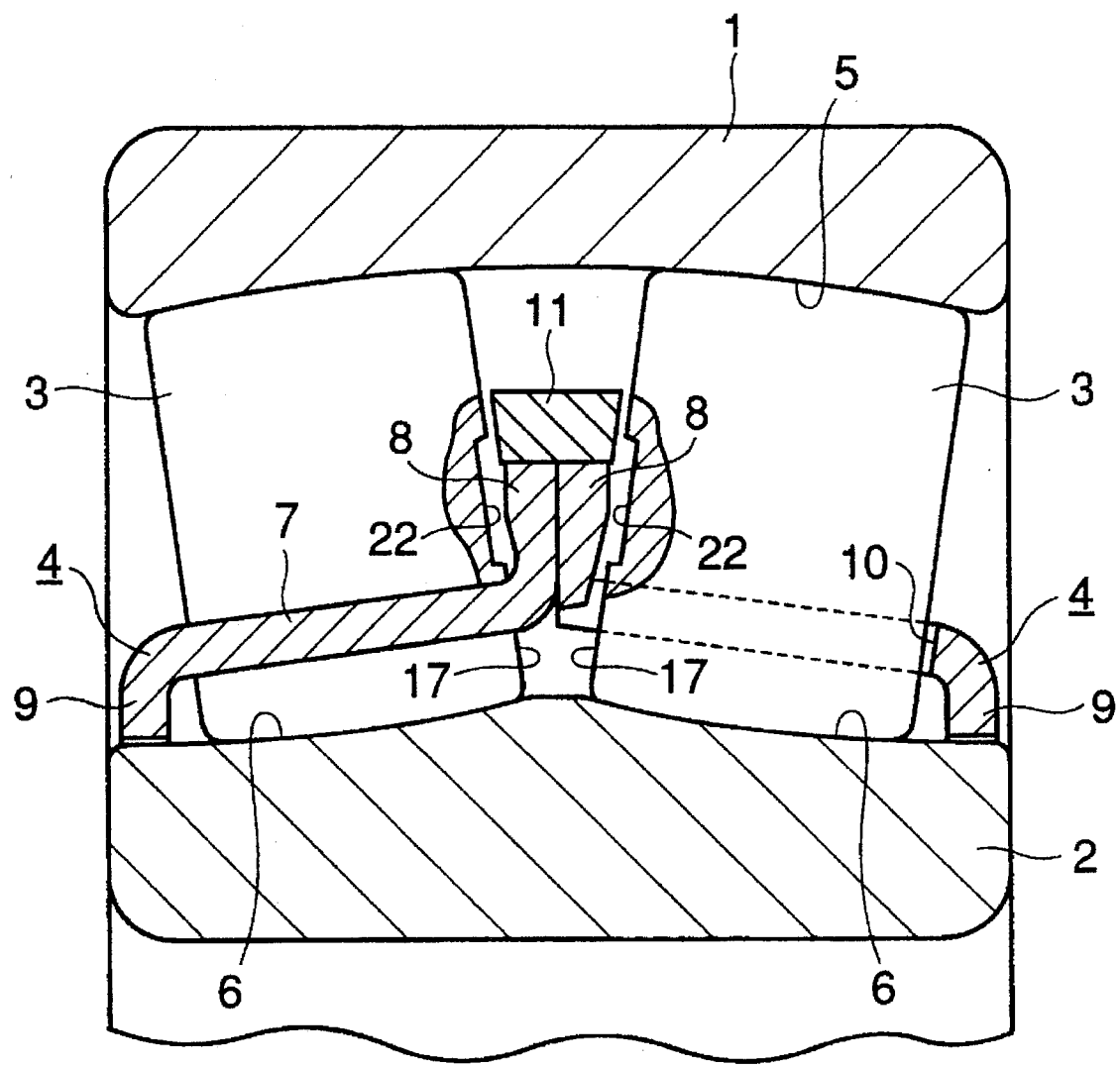
FIG. 1 is a partial cross sectional view of a half portion of the self aligning roller bearing with retainer according to a first example of the prior art structure.
Figure 2:
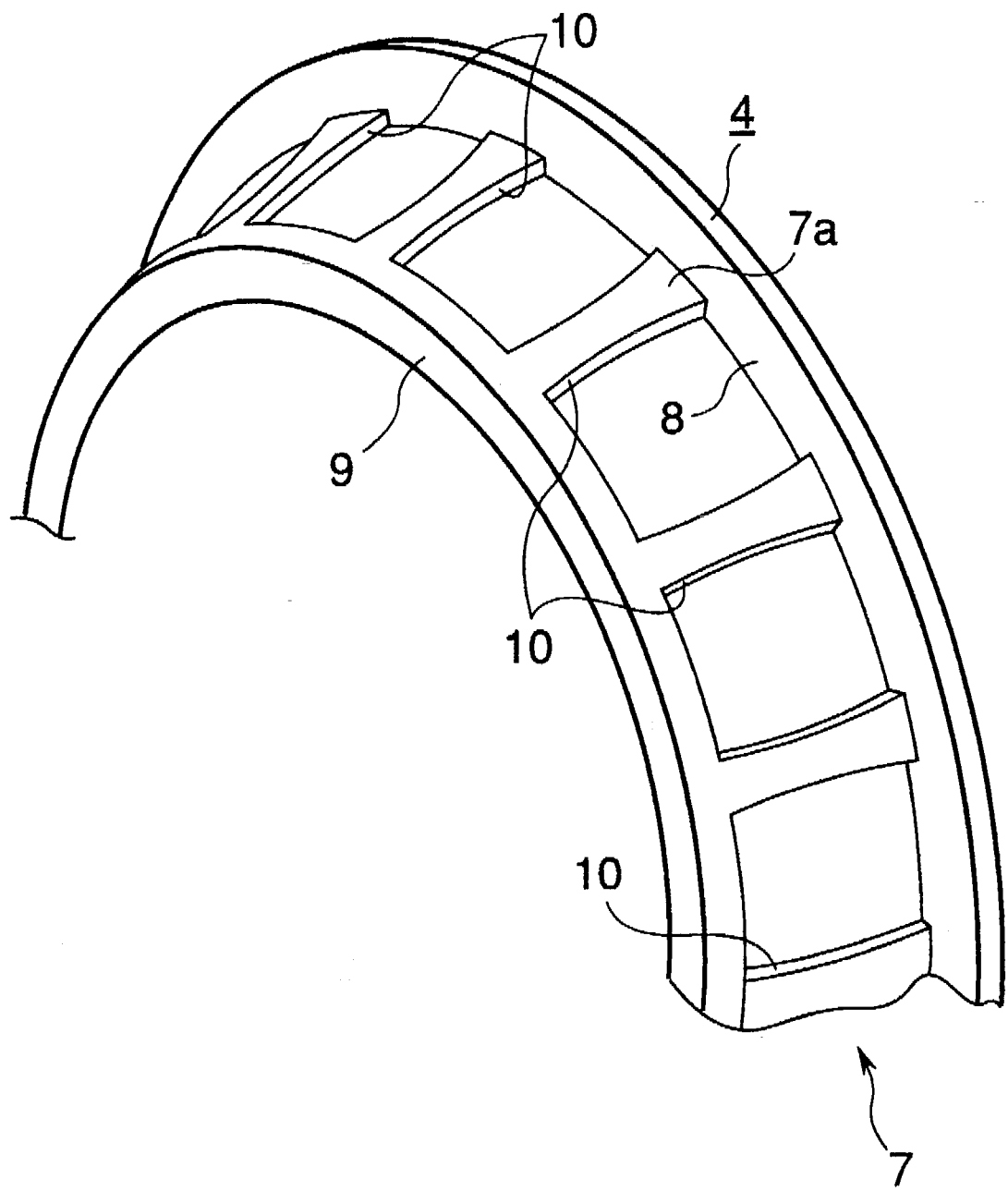
FIG. 2 is a perspective view of a half portion of the retainer to be installed in the first example of the prior art structure.
Figure 3:
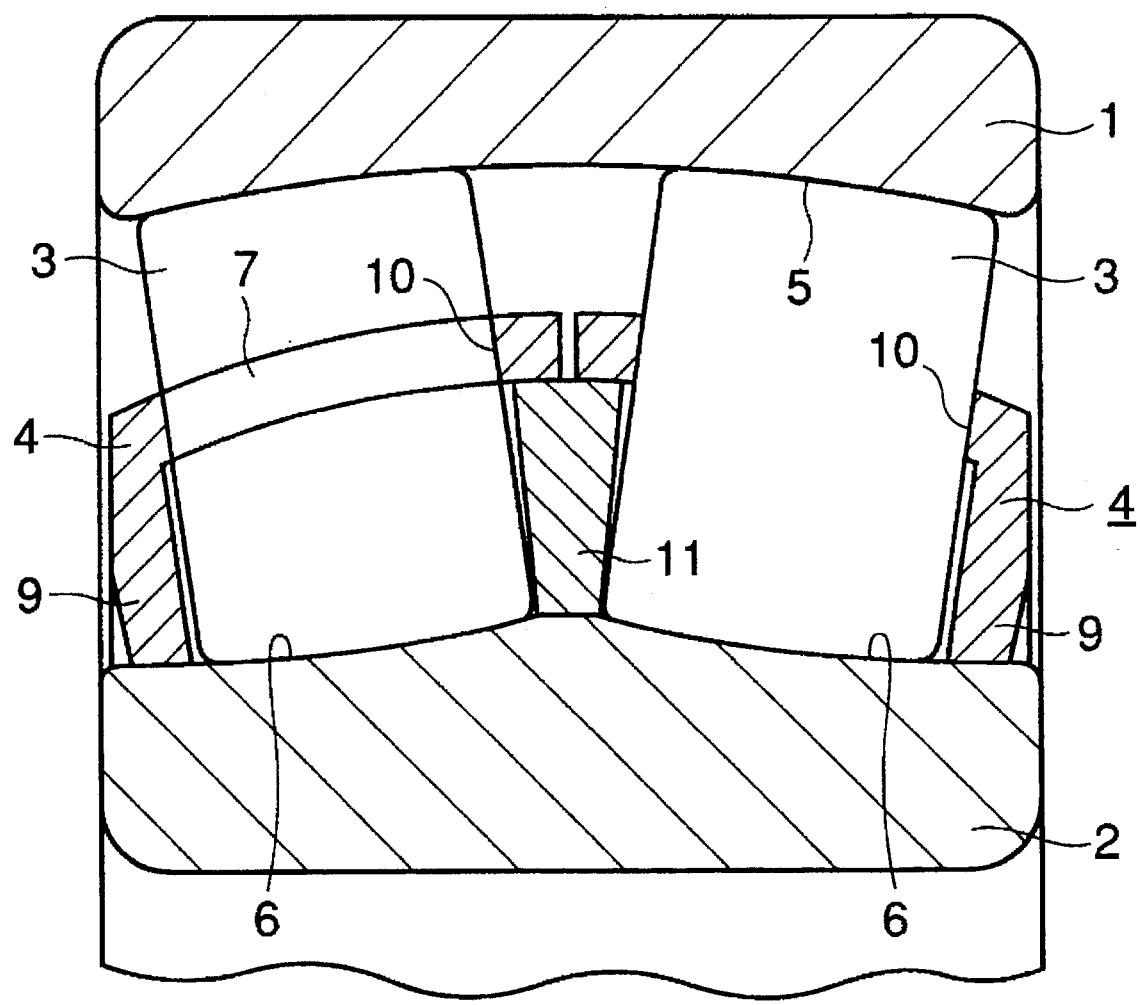
FIG. 3 is a partial cross sectional view of a half portion of the self aligning roller bearing with the retainer according to the second example of the prior art structure.
Figure 4:
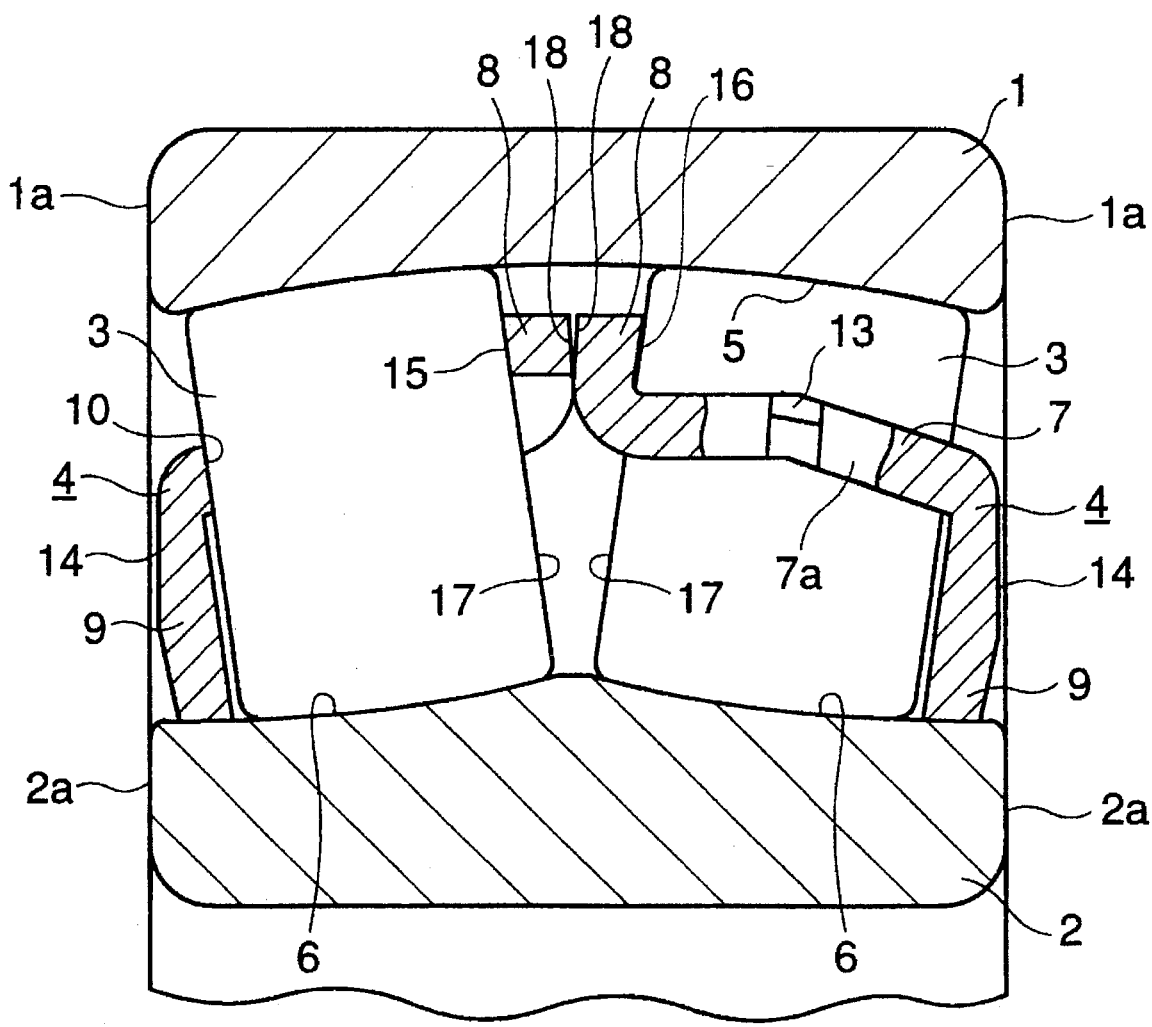
FIG. 4 is a partial cross-sectional view showing a half portion of a self-aligning roller bearing with retainer of the copending JP patent application No. 6-202264.
Figure 7:
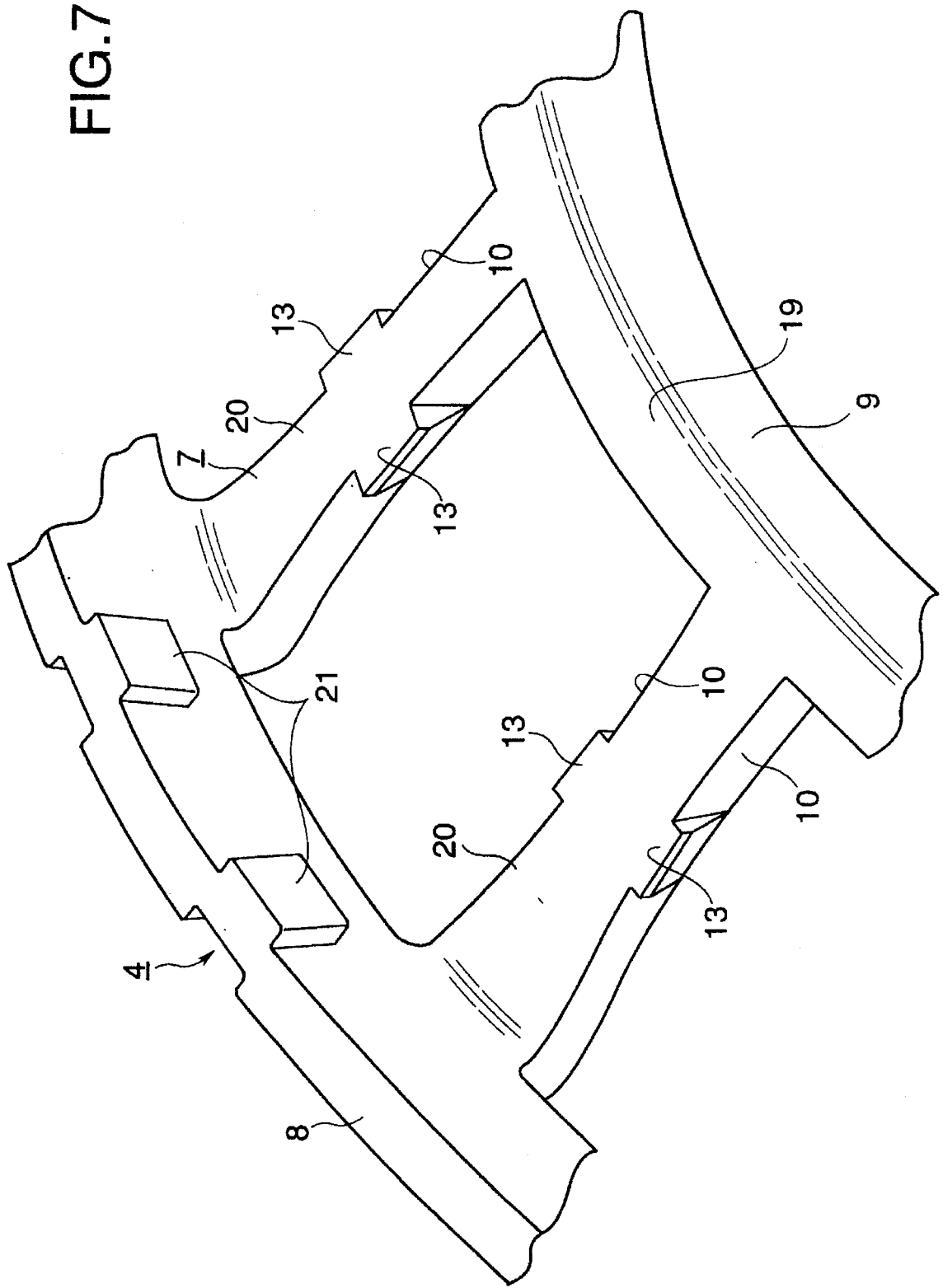
FIG. 7 is an enlarged perspective view of a part of a retainer according to an embodiment of the present invention.
Figure 8:
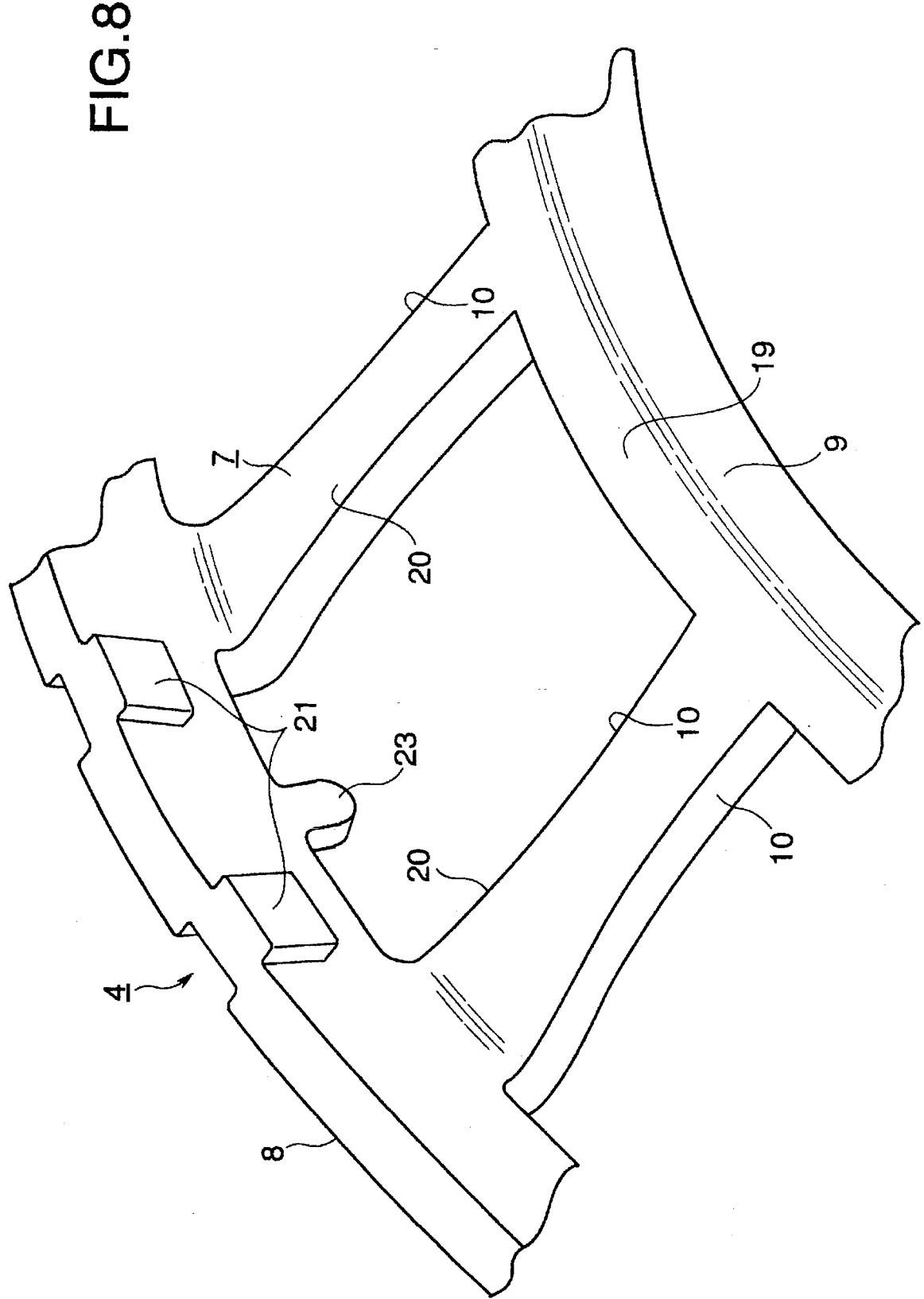
FIG. 8 is an enlarged perspective view of a part of a retainer according to an another embodiment of the present invention.
Figure 9:
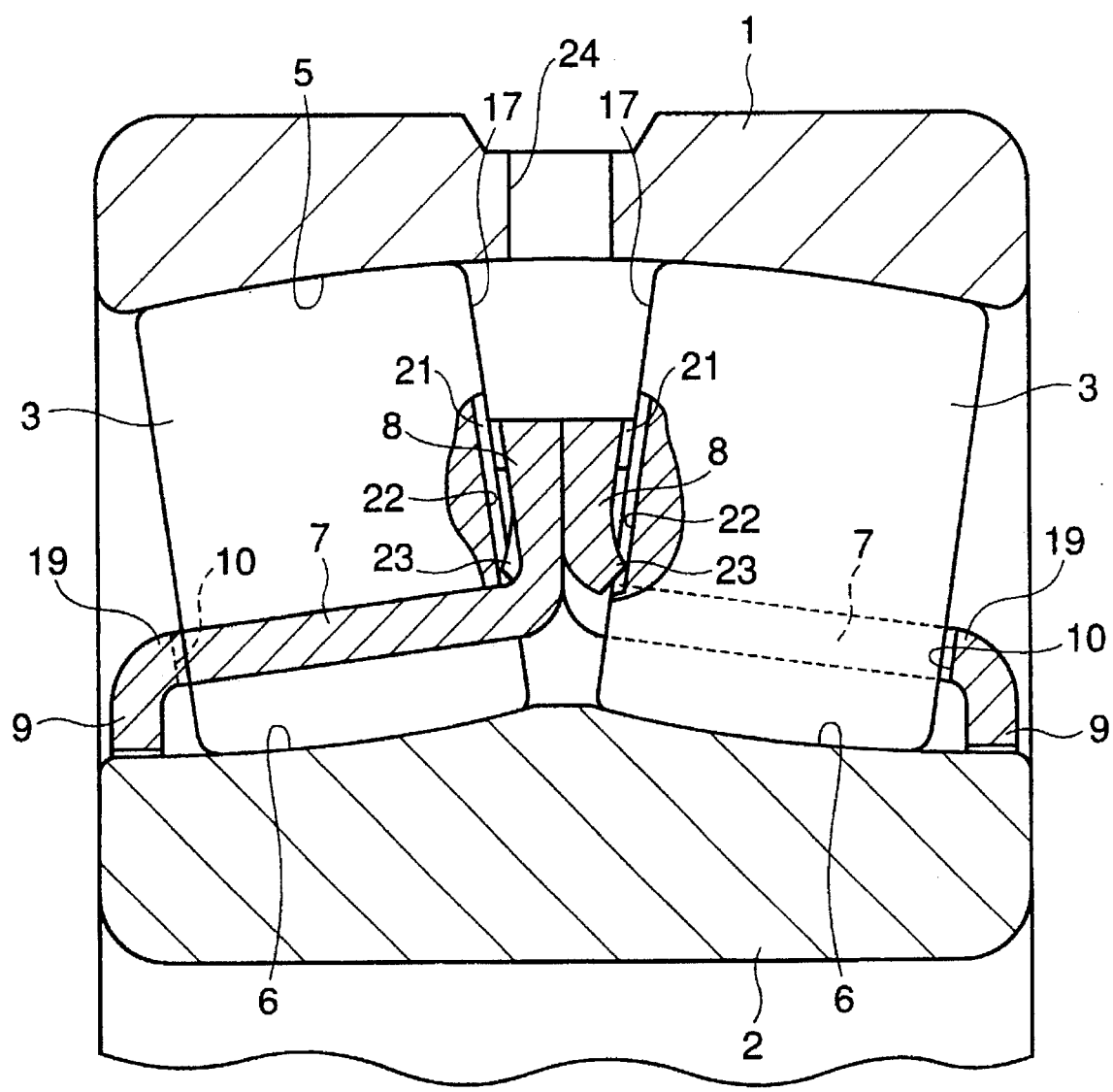
FIG. 9 is a partial cross sectional view of a half portion of the self aligning roller bearing where the retainer in FIG. 8 is incorporated.

New, FIGS. 7 through 9 show first and second embodiments of the present invention. The feature of the present invention is that the axially outside face of the outwardly flanged portion 8 located on the inside of the pockets 10 is formed with two protrusions 21 protruding towards the inside of the respective pockets 10 in order to prevent displacement of the convex rollers 3 inside the pockets 10 of the retainers 4. The construction and operation of the other parts of the retainer 4 are the same as for the beforementioned conventional construction shown in FIGS. 1 to 3, and hence further diagrams and description are omitted. As follows is a description centered on the construction and operation of the retainer 4.

FIG. 7 shows a first embodiment according to the present invention. The retainer 4 made by press forming a metal plate such as a steel plate, has a main portion 7 of a hollow cylindrical frustum shape, an outwardly flanged portion 8 and an inwardly flanged portion 9. A plurality of pockets 10 are formed by a punching operation between the circumferentially adjacent pairs of crossbars 20 in the main portion 7 and separated by crossbars 20 at even spacing around the circumferential direction.

Furthermore, an outwardly flanged portion 8 is formed by bending the first axial end portions of the crossbars 20 in the retainer 4 (the upper left end in FIG. 7) radially outward. An inwardly flanged portion 9 is bent down at an outer rim of the annular portion 19 adjacent the second axial end portions of the crossbars 20.

Provided on central portions of the respective crossbars 20 are protrusion 13 protruding into the respective pockets 10. Consequently, the plurality of pockets 10 are respectively defined by the outwardly flanged portion 8 provided at one axial end of the main portion 7, the annular portion 19 of the inwardly flanged portion 9 provided at the other axial end (the lower right end in FIG. 7), and the crossbars 20 connecting between the outwardly flanged portion 8 and the annular portion 19.

The convex rollers 3 having first and second opposite end faces are inserted into the pockets 10 from the inner diameter side, respectively, and prevented by protrusions 13 from passing through to the outer diameter side.

Protrusions 21 are formed on the face of the outwardly flanged portion 8 opposed to the pockets 10, two protrusions being formed for each pocket 10 in spaced apart relation around the circumferential direction.

With the convex rollers 3 inserted into the pockets 10 from the inner diameter side to assemble the roller bearing, then the end faces of the protrusions 21 are in close proximity to or rub against the first end face axially inside end faces of the convex rollers 3, while the axially inside end rim of the annular portion 19 rubs against or is in close proximity to the second face or axially outside end faces of the convex rollers 3. Therefore skewing of the convex rollers 3 is prevented.

That is to say, when the self aligning roller bearing with retainer is assembled with the retainers 4 and the convex rollers 3 fitted between the outer ring 1 and the inner ring 2 (FIG. 9), then the end faces of the respective protrusions 21 and the axially inside end rim of the annular portion 19 are in close proximity to or rub against the respective opposite axial end faces of the convex rollers 3. Consequently, the alignment or attitude of each convex roller 3 is controlled by the engagement with the end faces of the two protrusions 21.

The protrusions 13 formed on the central portion of the respective crossbars 20, however, are separated from the rolling face of the convex rollers 3. Moreover, the respective crossbars 20 are located diametrically outward from the pitch circle of the convex rollers 3. That is to say, the respective protrusions 13 have the function of preventing the convex rollers 3 from coming out of the retainer 4 in the radial direction, but have no function in controlling the alignment or attitude of the convex rollers 3 after assembly.

With the self aligning roller bearing with retainer of the present invention constructed as described above, since the end faces of the protrusions 21 protruding towards the inside of the pockets 10 are in close proximity to or rub against the axially inside end faces of the convex rollers 3, while the axially outside end faces of the convex rollers 3 rub against or are in close proximity to the axially inside end rim of the annular portion 19, then displacement of the convex rollers 3 relative to the pockets 10 can be effectively prevented. That is to say, there is substantially no space, or only a very small space, between the axial opposite end faces of the convex rollers 3 and the end faces of the protrusions 21 and the end rim of the annular portion 19. Therefore, the central axis of the convex rollers 3 is not inclined, or only very slightly inclined, with reference to the central axis of the pockets 10. Since there will be practically no inclination of the central axis of the retainers 4 having a large diameter relative to the central axis of the self aligning roller bearing, then skewing of the convex roller 3 can be reliably prevented provided that inclination of the convex rollers 3 inside the pockets 10 is prevented.

Forming the protrusions 21 to predetermined dimensions, and controlling the distance between the end faces of the two protrusions 21 and the inside end rim of the annular portion 19 to a predetermined value in the relation to the lengthwise dimension of the convex roller 3 is much simpler than controlling the shape dimensions of the overall inner peripheral rim of the pockets 10 and of the outwardly flanged portion 8 to predetermined values. Consequently, manufacturing costs for the retainer 4 are lower.

Moreover, since the protrusions 21 can be small, then the length of rubbing engagement between the protrusions 21 and the axially inside end face of the convex rollers 3 in the roller bearing can be short. Consequently, the torque required to rotate the convex rollers 3, and the rotation torque for the self aligning roller bearing with retainer is minimized.

Furthermore, there is a sufficiently large gap between the axially outside face of the outwardly flanged portion 8 and the axially inside end face of the convex rollers 3 in the roller bearing, at a location circumferentially away from the two protrusion 21. Therefore lubricating oil can flow through the gap, or grease can be retained in the gap, so that lubrication of the self aligning roller bearing with retainer can be adequately maintained.

The operation of forming the respective protrusions 21 is preferably carried out in the last step of forming the retainer 12. This is to prevent the dimensions such as the distance between the end faces of the respective protrusions 21 and the end rim of the annular portion 19, and the dimensional shape of the respective portions, from deviating from the desired respective values and shape due to other processing to be carried out after forming the protrusions 21.

FIGS. 8 and 9 show a second embodiment of the present invention. With this embodiment, to prevent the convex roller 3 from being pushed radially outward (in the upwards direction in FIG. 9) from the pockets 10, resilient tongues 23 are formed on the inner peripheral rim of the outwardly flanged portion 8 of the retainer 12, so that the tongues 23 are positioned at a portion circumferentially central to the respective pockets 10, respectively.

The resilient tongues 23 are inclined relative to the outwardly flanged portion 8 in the direction that the tip ends of the resilient tongues 23 protrude into the respective pockets 10.

The protrusions 13 formed on the respective crossbars 20 in the abovementioned first embodiment (FIG. 7) are not provided in the second embodiment.

With the self aligning roller bearing with retainer in the assembled condition, the main portion 7 of the retainer 4 is located as shown in FIG. 9, radially inwards of the pitch circle of the convex rollers 3.

Furthermore, the resilient tongues 23, as shown in FIG. 9, respectively engage with circular recessed portions 22 formed in the central portions of the axially inside end faces 17 of the respective convex rollers 3 in the roller bearing, thereby preventing the convex rollers 3 from coming out of the pockets 10 in the radial direction of the roller bearing.

The respective recessed portions 22 are not limited to the circular shape shown in FIG. 9, but may be of an annular shape concentric with the respective convex rollers 3. In any case, the end faces of the protrusions 21 formed on the axially outside face of the outwardly flanged portion 8 are in close proximity to or rub against the axially inside end face 17 of the convex rollers 3 at a portion which is displaced radially outer from outside of the respective recessed portions 22 in the radial direction of the convex rollers 3.

The construction for preventing the convex rollers 3 from coming out of the retainer, based on the engagement of the recessed portion 22 with the resilient tongue 23 and the shape of the recessed portions 22 are disclosed in the Japanese Patent First Publication No. H5-157116.

Due to the abovementioned construction and operation of the present invention, skewing of the convex roller can be reliably prevented irrespective of the conditions of use. Therefore, increase in the rotation torque of the self aligning roller bearing with retainer, and seizure thereof can be effectively prevented.

Moreover, since the manufacturing operation for the retainer is not difficult, then the manufacturing costs of the self aligning roller bearing with retainer can be minimized. Moreover, since there is no deterioration in lubrication, nor increase in rotation torque, then it is possible to provide a self aligning roller bearing with retainer having excellent endurance and reliability, as well as excellent performance.

What is claimed is:

1. A self aligning roller bearing with retainer comprising: an outer ring having an inner peripheral face formed with an outer ring raceway in a shape of a spherical concave surface with a single center, an inner ring having an outer peripheral face formed with a pair of inner ring raceways opposite to the outer ring raceway, a plurality of convex rollers with first and second opposite end faces provided so as to be freely rotatable between the outer ring raceway and the inner ring raceway, and a pair of retainers comprising a main portion formed in a hollow cylindrical frustum shape, with larger and smaller diameter ends and having a plurality of crossbars, an outwardly flanged portion extending radially outward from the larger diameter end of the main portion and an inwardly flanged portion extending radially inward from the smaller diameter end of the main portion, and connected to the outwardly flanges portion by the crossbars so as to form a plurality of pockets, each pocket defined by two of the crossbars and outwardly and inwardly flanged portions to receive one of the convex rollers, the outwardly flanged portion having protrusions each protruding towards the pocket so as to rub against or be in close proximity to the first end face of the convex rollers, and the protrusions having an end face for guiding each of the convex rollers retained inside the respective pockets.

2. The self aligning roller bearing with retainer of claim 1, wherein the convex rollers are arranged on a pitch circle and the crossbars of the retainers are located radially inside the pitch circle of the convex rollers.

3. The self aligning roller bearing with retainer of claim 1, wherein the convex rollers are arranged on a pitch circle and the crossbars of the retainers are located radially outside the pitch circle of the convex rollers.

* * * * *